United States Patent
Chiu

(10) Patent No.: US 7,946,498 B2
(45) Date of Patent: May 24, 2011

(54) MEMORY MODULE WITH DISPLAY FUNCTIONS

(75) Inventor: Hui-Chen Chiu, Sinjhuang (TW)

(73) Assignee: SiliconMotion Inc., Jhubei, Hsinchu County (TW)

( * ) Notice: Subject to any disclaimer, the term of this patent is extended or adjusted under 35 U.S.C. 154(b) by 1069 days.

(21) Appl. No.: 11/468,061

(22) Filed: Aug. 29, 2006

(65) Prior Publication Data

US 2007/0285362 A1    Dec. 13, 2007

(30) Foreign Application Priority Data

Jun. 6, 2006 (TW) ................................ 95120086 A

(51) Int. Cl.
*G06K 19/06* (2006.01)
*G06K 19/00* (2006.01)

(52) U.S. Cl. ........................................ 235/492; 235/487

(58) Field of Classification Search .................. 235/487, 235/492
See application file for complete search history.

(56) References Cited

U.S. PATENT DOCUMENTS

| | | | | |
|---|---|---|---|---|
| 4,746,787 A * | 5/1988 | Suto et al. | | 235/379 |
| 4,954,985 A * | 9/1990 | Yamazaki | | 365/108 |
| 5,734,154 A * | 3/1998 | Jachimowicz et al. | | 235/492 |
| 6,050,494 A * | 4/2000 | Song et al. | | 235/492 |
| 6,402,039 B1 * | 6/2002 | Freeman et al. | | 235/492 |
| 6,457,650 B1 * | 10/2002 | Suzuki et al. | | 235/492 |
| 2002/0088863 A1 * | 7/2002 | Ou | | 235/487 |
| 2004/0046036 A1 * | 3/2004 | Koshimizu et al. | | 235/492 |

FOREIGN PATENT DOCUMENTS

| | | |
|---|---|---|
| JP | 3120297 | 12/1991 |
| JP | 2000-276559 | 10/2000 |
| JP | 2001-216486 | 8/2001 |
| JP | 2004-326146 | 11/2004 |
| JP | 2007-523375 | 8/2007 |

OTHER PUBLICATIONS

English language translation of abstract of JP 2004-326146 (published Nov. 18, 2004).
English language translation of abstract of JP 2001-216486 (published Aug. 10, 2001).
English language translation of claims of JP 3120297 (published Dec. 10, 1991).
English language translation of abstract of JP 2000-276559 (published Oct. 6, 2000).
English language translation of abstract of JP 2007-523375 (published Aug. 16, 2007).

* cited by examiner

*Primary Examiner* — Daniel A Hess
*Assistant Examiner* — Matthew Mikels
(74) *Attorney, Agent, or Firm* — Thomas, Kayden, Horstemeyer & Risley

(57) ABSTRACT

A memory module with display functions and a display unit thereof are provided. The memory module includes a first circuit board, a memory chip, a display unit and a controller. The memory chip is disposed on the first circuit board. The display unit is disposed on the first circuit board. The display unit has the same package type as the memory chip. The controller is disposed on the first circuit board. The controller is configured to control the memory chip and provide information about the memory chip to the display unit, such that the display unit is capable of displaying information about the memory chip.

7 Claims, 1 Drawing Sheet

MEMORY MODULE WITH DISPLAY FUNCTIONS

RELATED APPLICATIONS

The present application is based on, and claims priority from, Taiwan Application Serial Number 95120086, filed Jun. 6, 2006, the disclosure of which is hereby incorporated by reference herein in its entirety.

BACKGROUND

1. Field of Invention

The present invention relates to a memory module, and more particularly, to a memory module with display functions.

2. Description of Related Art

With the rapid development of electronic device, there has recently been a tremendous growth in the demand for memory storage devices. For example, different types of memory cards, including CompactFlash (CF), Multi-Media Card (MMC), Secure Digital (SD), Mini Secure Digital (MiniSD), Memory Stick (MS) memory cards and thumb drives with USB interfaces have become very popular. In general, a memory storage device has a memory module that is a main component of the memory storage device for storing data. The memory module includes a circuit board, a plurality of memory chips and a controller. The memory chips and the controller are disposed on the circuit board.

However, most conventional memory modules do not provide a display function; instead, conventional memory modules only provide storage and I/O functions. Users cannot acquire the information about the amount of space used and the amount of remaining space unless they connect the memory storage device with a computer. Hence, the remaining amount of space may be insufficient when users store files in the memory module.

To overcome this problem, a driver IC and a display device can be disposed on the memory module to display the information users need. Unfortunately, there are several shortcomings to the conventional approach. One problem is that the layout of the circuit board of the memory module has to be modified greatly. Moreover, the amount of components on the memory module increases. Increasing the components on the memory module may cause difficulties in manufacturing the memory module. Furthermore, the memory module may be too large to be applied to a tiny memory storage device, such as a MiniSD memory card.

Accordingly, providing a memory module with display functions that comprises fewer components without having to modify the circuit board of the memory module greatly is an issue of great consequence.

SUMMARY

The present invention provides a memory module with display functions. The memory module includes a first circuit board, a memory chip, a display unit and a controller. The memory chip is disposed on the first circuit board. The display unit is disposed on the first circuit board. The display unit has the same package type as the memory chip. The controller is disposed on the first circuit board. The controller is configured to control the memory chip and provide information about the memory chip to the display unit, such that the display unit is capable of displaying information about the memory chip.

According to preferred embodiments, the display unit includes a second circuit board, a driver IC, at least one passive component, a package structure and a display device. The driver IC is disposed on the second circuit board. The passive component is disposed on the second circuit board. The second circuit board, the driver IC and the passive component are packaged in the package structure. The display device is disposed on the package structure and coupled electrically with the driver IC.

The present invention also provides a memory module with display functions. The memory module includes a first circuit board, a memory chip and a display unit. The memory chip is disposed on the first circuit board. The display unit is disposed on the first circuit board. The display unit has the same package type as the memory chip. The display unit includes a second circuit board, a driver IC, at least one passive component, a controller, a package structure and a bi-stable display device. The driver IC is disposed on the second circuit board. The passive component is disposed on the second circuit board. The controller is disposed on the second circuit board. The controller is configured to control the memory chip and provide information about the memory chip to the display unit. The second circuit board, the driver IC, the passive component and the controller are packaged in the package structure. The bi-stable display device is disposed on the package structure and coupled electrically with the driver IC for displaying information about the memory chip, such that the display unit is capable of displaying information about the memory chip.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

A memory module with display functions can be applied to a memory storage device to display the amount of space used and the remaining amount. However, the conventional approach has to modify the layout of the circuit board of the memory module greatly. Moreover, the memory module with more components may be too large to be applied to a tiny memory storage device. The present invention provides a memory module with display functions, which utilizes a display unit to display information of a memory chip disposed on the memory module. The display unit has the same package type as the memory chip. Thus, the display unit can be applied to an ordinary memory module without modifying the layout of the circuit board of the memory module greatly. Moreover, a driver IC and passive components of the display unit can be packaged in a package structure. The package structure can be assembled with a display device to form the display unit. Thus, the size and the amount of components of the memory module can be reduced and the memory module can be applied to a tiny memory storage device.

Figure 1:
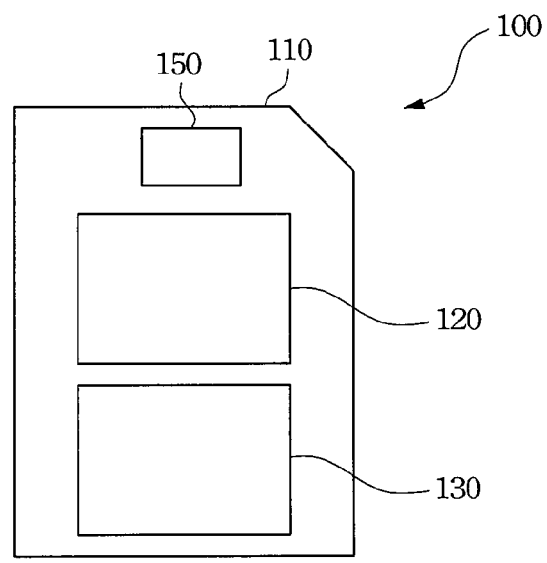
FIG. 1 is a schematic view of one preferred embodiment of the present invention.

FIG. 1 is a schematic view of one preferred embodiment of the present invention. The memory module 100 can be applied to a memory storage device, such as a MiniSD card. The memory module 100 includes a first circuit board 110, a memory chip 120, a display unit 130 and a controller 150. The memory chip 120 disposed on the first circuit board 110 can be a flash memory. The display unit 130 disposed on the first circuit board 110 is capable of displaying the information of the memory chip 120. The controller 150 disposed on the first circuit board 110 is configured to control the memory chip 120 and output the information of the memory chip 120 to the display unit 130. The display unit 130 has the same package type as the memory chip 120. Thus, the display unit 130 can be applied to the memory module 100 that can contain a plurality of memory chips without modifying the layout of the circuit board 110 greatly.

More specifically, the package type of the memory chip 120 may be the Thin Small Outline Package (TSOP) type or the Very Very Small Outline Package (WSOP) type. Take the WSOP type, for example, the dimensions of a WSOP-pack memory chip are about 12 mm long, about 17 mm wide and about 0.7 mm thick. The dimensions of the display unit 130 can be designed according to the WSOP-pack memory chip. For example, the dimensions of the display unit 130 are about 12 mm long, about 17 mm wide and not more than 0.7 mm thick. Further, the layout of the first circuit board 110 may be designed to contain two WSOP-pack memory chips. Thus, the display unit 130 can hold one display unit 130 and one WSOP-pack memory chip to provide display functions or alternatively hold two WSOP-pack memory chips to provide larger storage capacity. This can improve the flexibility of the memory module 100.

Figure 2:
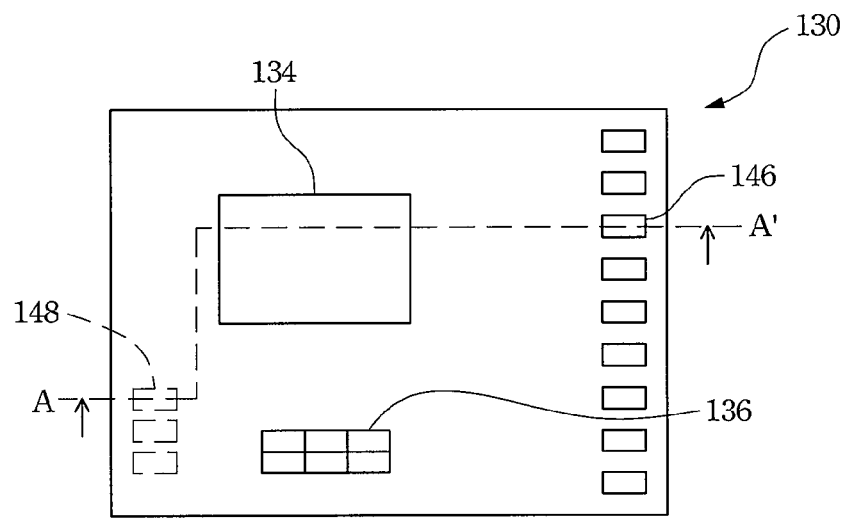
FIG. 2 is schematic view of the display unit in FIG. 1.
Figure 3:
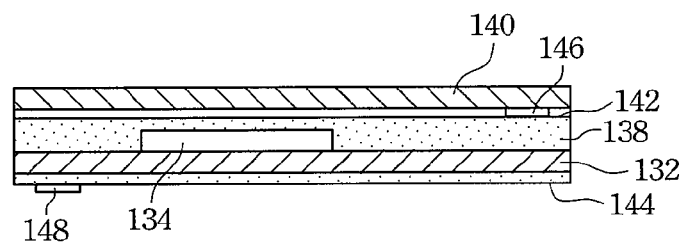
FIG. 3 illustrates a cross-sectional view from the A-A' line in FIG. 2.

FIG. 2 is a schematic view of the display unit in FIG. 1 and FIG. 3 illustrates a cross-sectional view from the A-A' line in FIG. 2. Referring to FIG. 2 and FIG. 3, the display unit 130 includes a second circuit board 132, a driver IC 134, a plurality of passive components 136, a package structure 138 and a display device 140. The driver IC 134 that is capable of driving the display device 140 can be disposed on the second circuit board 132 by using the flip chip interconnect technology. The passive component 136, such as a capacitor or a resistor can be disposed on the second circuit board 132 by using the surface mount technology (SMT). The second circuit board 132, the passive component 136 and the driver IC 134 are packaged in the package structure 138. The package structure 138 can be made of Epoxy. Pluralities of conducting pads for inputting/outputting signals are disposed on the lower surface 144 and the upper surface 142 of the package structure 138 respectively. The display device 140 disposed on the package structure 138 may be a bi-stable display. The display device 140 can be coupled electrically with the first circuit board 110 and the driver IC 134 by welding the display device 140 to the conducting pads 146 on the upper surface 142. Thus, driving signals can be transmitted from the driver IC 134 to display device 140 via the conducting pads 146 on the upper surface 142.

Referring to FIG. 1, FIG. 2 and FIG. 3, the display unit 130 can be coupled electrically with the first circuit board 110 and the controller 150 via the conducting pads 148 on the lower surface 144. The controller 150 is configured to control the memory chip 120 and retrieve the information about the free capacity and the stored content of the memory chip 120. The controller 150 provides the information to the display unit 130 and then a driving signal is transmitted to the display device 140 via the conducting pads 146 on the upper surface 142 to display the information.

It is worth noting that the second circuit board 132, the driver IC 134 and the passive component 136 are packaged in the package structure 138 that can be further assembled with the display device 140 to form the display unit 130. Thus, the assembly process to produce the memory module 100 can be simplified and the size of the memory module 100 can be reduced. Moreover, the controller 150 can be also packaged in the package structure 138 by utilizing the multi-chip packaging (MCP) technology, which is able to reduce the length of the connecting wire disposed between the driver IC 134 and the controller 150. Thus, the size of the memory module 100 can be reduced further. It should be noted that the present invention is not intended to be limited to the embodiment. The memory module 100 of the present invention can be applied to any electronic devices to provide display functions without increasing many dimensions.

According to preferred embodiments mentioned above, the memory module with display functions of the present invention has the following advantages. Firstly, the memory module has a display unit that displays the information of the memory chip and thereby allows users to acquire the information about the free capacity and the stored content of the memory module. Secondly, the display unit of the memory module has the same package type as the memory chip. Thus, the display unit can be applied to an ordinary memory module without modifying the layout of the circuit board greatly. Thirdly, the second circuit board, the driver IC and the passive component are packaged in the package structure. Thus, the memory module can be applied to a tiny storage device.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A memory module with display functions in the form of a memory card, memory stick, or USB thumb drive, comprising:
a first circuit board; a memory chip disposed on the first circuit board;
a display unit disposed on the first circuit board, having the same package type as the memory chip; wherein the display unit comprises:
a display device;
a package structure disposed below the display device and having an upper surface and a lower surface, the package structure comprising:
a second circuit board;
a driver IC disposed on the second circuit board; and
at least one passive component disposed on the second circuit board; and
a plurality of first conducting pads disposed on the upper surface of the package structure for electrically connecting the driver IC and the display device; and
a controller disposed on the first circuit board, configured to control the memory chip and provide information about the memory chip to the display unit, wherein the display unit is capable of displaying information about the memory chip.

2. A memory module with display functions as recited in claim 1, wherein the display unit further comprises a plurality of second conducting pads disposed on the lower surface of the packaged structure for electrically connecting the display unit and the controller.

3. A memory module with display functions as recited in claim 1, wherein the display device is a bi-stable display device.

4. A memory module with display functions as recited in claim 1, wherein the package type of the display unit and the memory chip is the Thin Small Outline Package (TSOP) or the Very Very Small Outline Package (WSOP).

5. A memory module with display functions in the form of a memory card, memory stick, or USB thumb drive, comprising:
- a first circuit board; a memory chip disposed on the first circuit board; and
- a display unit disposed on the first circuit board, having the same package type as the memory chip, wherein the display unit comprises:
- a second circuit board;
- a driver IC disposed on the second circuit board;
- at least one passive component disposed on the second circuit board;
- a controller disposed on the second circuit board, configured to control the memory chip and provide information about the memory chip to the display unit;
- a package structure having an upper surface and a lower surface, wherein the second circuit board, the driver IC and the passive component are packaged in the package structure;
- a bi-stable display device disposed above the package structure; and a plurality of first conducting pads disposed on the upper surface of the package structure for electrically connecting the driver IC and the bi-stable display device; wherein the display unit is capable of displaying information about the memory chip.

6. A memory module with display functions as recited in claim 5, wherein the display unit further comprises a plurality of second conducting pads disposed on the lower surface of the package structure for connecting the display unit and the first circuit board.

7. A memory module with display functions as recited in claim 5, wherein the package type of the display unit and the memory chip is the Thin Small Outline Package (TSOP) or the Very Very Small Outline Package (WSOP).

* * * * *